Nov. 15, 1966  T. KREY  3,285,363
METHOD OF GENERATING SEISMIC WAVES
Filed Sept. 9, 1963  2 Sheets-Sheet 1
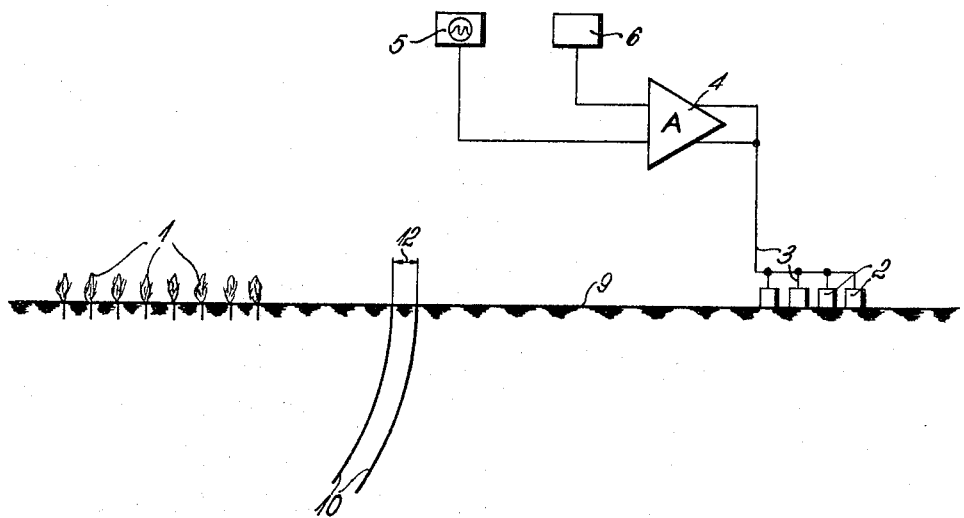
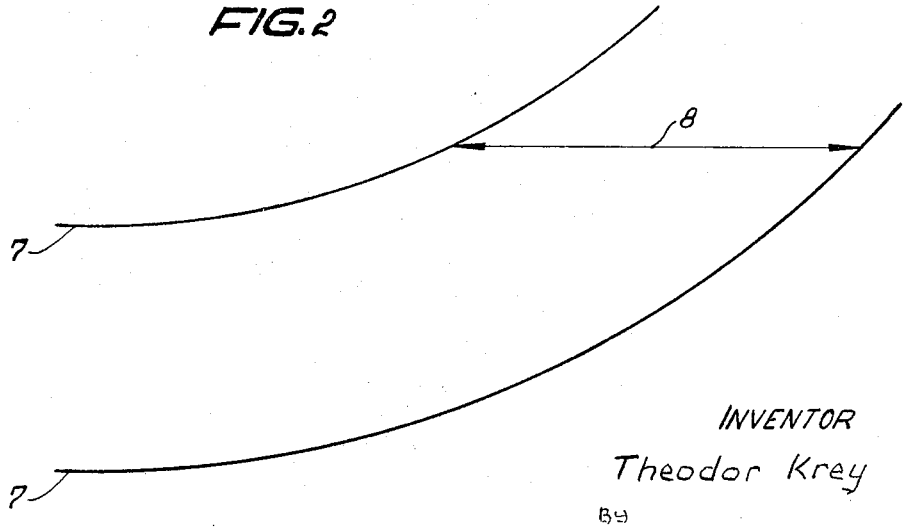
INVENTOR
Theodor Krey
BY
Richards & Geier
ATTORNEYS Nov. 15, 1966  T. KREY  3,285,363
METHOD OF GENERATING SEISMIC WAVES
Filed Sept. 9, 1963  2 Sheets-Sheet 2
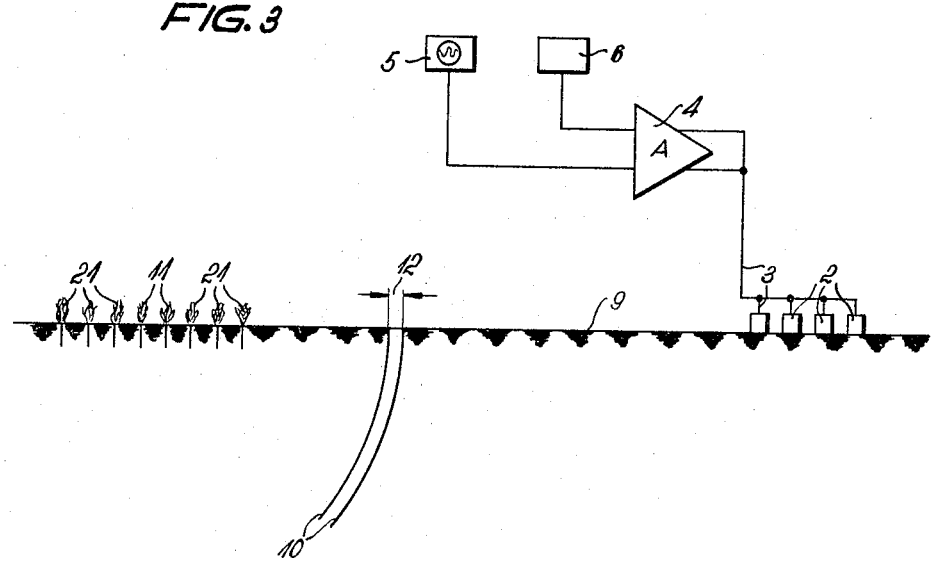
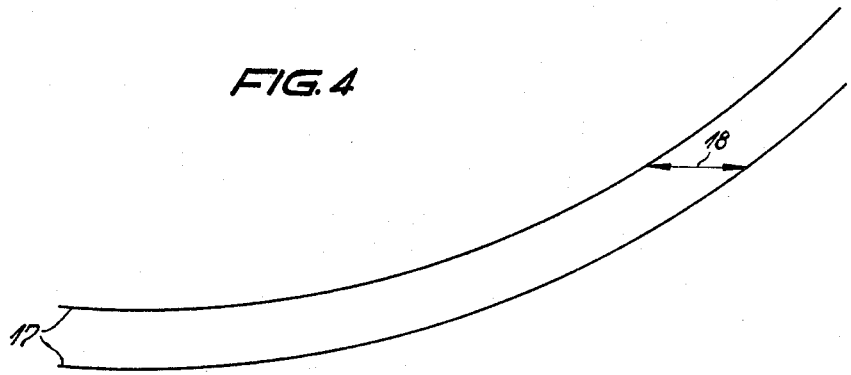
INVENTOR
Theodor Krey
BY
Richards & Geier
ATTORNEYS 3,285,363
METHOD OF GENERATING SEISMIC WAVES
Theodor Krey, Wissmannstrasse 14,
Hannover, Germany
Filed Sept. 9, 1963, Ser. No. 307,683
Claims priority, application Germany, Sept. 8, 1962,
S 81,369
6 Claims. (Cl. 181—.5)

This invention relates to a method of seismic prospecting, and more particularly to a method by which in the seismic waves the ratio of amplitudes of the desired wave signals to disturbances is improved.

In reflection seismic surveying as generally practiced it is known in the art to distribute, in a certain arrangement, a plurality of sources of energy for generating seismic waves to cover the area under investigation, and for registration of waves, and to have said sources operate either simultaneously or with some mutual retardation. Those sources of energy consist, for example, of explosive charges at a point adjacent the surface of the earth, which charges by detonating generate seismic waves. Also, it is the practice to separately operate said sources one after another and register their waves in such manner that they can be reproduced, for example, on a magnetic tape, and later to add them up, which is known as stacking. These methods, which are also referred to as "multiple shooting," are employed to improve the ratio of the amplitudes of signal waves to the amplitudes of waves of disturbances.

The ratio of wavelengths of usable signals to the wavelengths of disturbances determines the most favourable distribution of the sources of energy over the area under investigation.

The spacing of the sources of energy, in profile direction on the surface of the earth, must not be larger than approximately one-half a wavelength of a usuable signal, measured in horizontal direction, but must be at least as long as the waves of disturbances, which are also measured in horizontal direction. The signals sent out by the sources of energy are composed of a variety of waves of different frequencies, each of which has its respective minimum useful wavelength, which is still desired to be generated and recorded in its full strength, and which is smaller with high frequencies than with low frequencies. Therefore, an arrangement of sources of energy for generation of seismic waves, long enough for waves of low frequency, often is too long for waves of higher frequency.

It is the object of the invention to provide a method by which the most advantageous arrangement of sources of energy can be used for low and high frequencies alike. According to the invention, the sources of energy are distributed over the area in such manner that the seismic waves generated by the externally located points do not contain as many high frequencies as those waves emanating from the more centrally located ones.

Also according to this invention the frequency spectrum of the seismic waves generated by the single sources of energy is manipulated in such way that the wave frequency decreases with increasing distance of the single sources of energy from the centre of the entire arrangement.

Other features and advantages of this invention will become apparent from the following description taken in connection with the accompanying drawings, which are in like scale and wherein FIG. 1 schematically illustrates a system employing the principle of "multiple shooting,"

FIG. 2 diagrammatically illustrates the wave fronts of the seismic waves generated by sources of energy employed in the system of FIG. 1, FIG. 3 is a schematic diagram of a seismic prospecting surface employed in this invention, FIG. 4 is a diagram of the wave fronts resulting from the system shown in FIG. 3.

Referring now to FIG. 1, a plurality of sources of energy 1 for the generation of waves are provided in the area under investigation. The sources may, by way of example, consist of explosive charges which may detonate either simultaneously or successively, in which latter case the single wave functions are added up by reproducible recordings. A plurality of geophones 2 are coordinated with one another and are connected by a cable 3 with an amplifier 4. The output of amplifier 4 is connected to an oscillograph 5 and a magnetic tape 6, on which the seismic waves are reproducibly recorded.

FIG. 2 refers to those waves generated by the sources of energy of FIG. 1, which are considered useful ones, and shows their wave fronts 7, which have the wavelength 8, measured parallel to ground surface 9.

The fronts of waves classified as disturbances are indicated by numeral 10 of FIG. 1. Their wavelength measured at ground surface, is indicated by numeral 12.

As can readily be seen from FIG. 2, the useful waves 8 are of a length which is greater than twice the longitudinal extension of the group of sources of energy, while the wavelength 12 of the disturbances is smaller than said longitudinal group extension.

FIG. 3 shows a diagram of essentially the same system as in FIG. 1 but, unlike the former, the wavelength 18 of the useful waves 17, which is shown in FIG. 4, is only half the length of the spacing of the group of sources of energy of FIG. 1. In the arrangement of FIG. 1, wavelength 18 would result in complete or partial extinction of the wave signals.

In order to avoid this extinction, according to the present invention, the sources of energy in the arrangement shown in FIG. 3 are divided into a central group 11 and two external groups 21. The sources of energy of central group 11 are equal to those of FIG. 1. However, the two external groups 21 are such that the waves generated by them are of lower frequencies than the frequencies of the waves 17 of FIG. 4.

Consequently, only the waves generated by central group 11 are effective since the wavelength 8 of useful waves is larger than double the longitudinal extension of group 11, while wavelength 12 of the disturbances 10 is smaller than a fraction of the length of group 11.

The method of the invention is not limited to definite frequencies; it may be applied to a multitude of them. In this case the single source of energy generates a frequency spectrum, the composition of which depends on the distance of the single sources from the centre point of the whole grouping. The larger the distance, the lower will the frequencies be which are contained in the spectrum.

The various spectrums of the seismic waves may be brought forth by varied methods. If the sources of energy consist of explosive charges one may use bigger charges for the bore holes located in the more external sphere of the grouping, while the more centrally located ones are provided with smaller charges, owing to the fact that the stronger the explosive charge is made, the lower will be the frequencies of the spectrum of the waves generated by the detonation. The additional energy created by the explosions of the external charges may easily be compensated by accordingly increasing the number of lower charges in the centre of the grouping.

Usually the wave grequencies contained in the spectrum are the higher the farther the explosive charge is sunk into the ground. Therefore, if like explosive charges for all the holes are used and the charges for the externally located holes are lowered less deep into the ground than the central one, this will supply the same effect of different spectrums as the variation of the charge itself.

Further, the variation of strength of explosion may usefully be combined with the method of varying the depth of the explosive charges.

If, instead of explosive charges, falling weights are used as sources of energy, the method according to the invention may be employed in that different size weights or different heights of fall of said weights or a combination of both arrangements are provided.

Another way of generating seismic waves is by employing vibrators which send out a sweep signal of changing frequency. With these apparatuses, the wave spectrum can easily be manipulated. It is one usual practice that the frequency of the generated signal waves is low as the vibrator is put into action and gradually raised as operation continues till it is stopped at a certain frequency. Preferably the vibrators are used driving along a road or profile and generating signals in response to a radio transmitted sweep and then moving to the next position. According to the invention the generated signal of the outer vibrators is stopped at a lower frequency than that generated by the inner vibrator positions of the spray. This will avoid any high frequencies to prevail towards the end of the signalling. Usually the generating of the sweep-wavetrains of one group of energy-sources is done one after the other and later adding the single recordings. This can be done only, if the generated sweep-wavetrain is the same in all vibrator-positions of one group of energy-sources. It may be mentioned here that cutting a smaller or bigger proportion off the end of the sweep-signals, as described above, does in no way disturb the operation or results of adding up.

While the invention has been described only with reference to particular embodiments thereof, it will be apparent that the invention is not limited to these embodiments and that it may be carried out in many other ways without departing from the spirit of the invention and that it is intended to cover such modifications as fall within the scope of the appended claims.

What is claimed is:

1. The method of seismic surveying, which comprises distributing a plurality of detectors in spaced relation in a linear array on the ground surface in a certain direction, each of said detectors being in contact with the ground for detecting seismic waves traveling therethrough and being connected to a recording system, creating in the ground surface seismic disturbances as origins of seismic waves, said disturbances being created at points which form a pattern having a longitudinal extension in the same direction as said linear array, each disturbance comprising a particular spectrum of frequencies, controlling each one of said spectra so that for each frequency the spacing between said sources of said pattern is at most equal to one half the wave length of a seismic signal wave of said frequency, said wave length being measured in the direction of said linear array, whereby disturbances created at the end portions of the longitudinal extension of said pattern comprise spectra of lower frequencies and disturbances created at the central portion of the longitudinal extension of said pattern comprise spectra of higher frequencies, and recording the energization of said detectors produced by the detected seismic waves.

2. In the method according to claim 1, and employing dropping weights as sources of energy, varying the height of fall of said weights in relation to the distance of the single sources of energy from said central portion.

3. In the method according to claim 1, and employing dropping weights as sources of energy, varying the size of said weights in relation to the distance of the single sources of energy from said central portion.

4. In the method according to claim 1, and employing dropping weights as sources of energy, varying the height of fall and size of weight in relation to the distance of the single sources of energy from said central portion.

5. In the method according to claim 1, and employing vibrators as sources of energy, varying the frequency spectrums of the seismic waves generated by said vibrators in relation to the distance of the single vibrators from said central portion.

6. In the method according to claim 5, employing continuous wave vibrator sources which are swept from lower to higher frequencies and are stopped at different times dependent upon the distance of a source from the center of said linear array.

References Cited by the Examiner

UNITED STATES PATENTS

| | | | |
|---|---|---|---|
| 2,232,612 | 2/1941 | Klipsch | 181—.5 |
| 2,232,613 | 2/1941 | Klipsch | 181—.5 |
| 2,747,172 | 5/1956 | Bayhi | 181—.5 X |
| 2,849,076 | 8/1958 | Kaufman | 181—.5 |
| 2,989,135 | 6/1961 | Pierce et al. | 181—.5 |
| 3,022,851 | 2/1962 | Hasbrook | 181—.5 |
| 3,096,846 | 7/1963 | Savit et al. | 181—.5 |
| 3,142,815 | 7/1964 | Picou | 181—.5 X |

BENJAMIN A. BORCHELT, *Primary Examiner.*

R. M. SKOLNIK, *Assistant Examiner.*